(12) United States Patent
Legrand et al.

(10) Patent No.: US 7,161,736 B2
(45) Date of Patent: *Jan. 9, 2007

(54) SOLID IMMERSION LENS STRUCTURES AND METHODS FOR PRODUCING SOLID IMMERSION LENS STRUCTURES

(75) Inventors: Olivier Legrand, Paris (FR); Stephen R. Quake, San Marino, CA (US)

(73) Assignee: California Institute of Technology, Pasadena, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 10/933,156

(22) Filed: Sep. 1, 2004

(65) Prior Publication Data

US 2005/0036222 A1     Feb. 17, 2005

Related U.S. Application Data

(63) Continuation of application No. 10/465,526, filed on Jun. 18, 2003, now Pat. No. 6,836,384, which is a continuation of application No. 09/928,226, filed on Aug. 10, 2001, now Pat. No. 6,608,726, which is a continuation-in-part of application No. 09/640,907, filed on Aug. 16, 2000, now Pat. No. 6,301,055.

(51) Int. Cl.
     *G02B 21/00*     (2006.01)
(52) U.S. Cl. .................... 359/368; 359/385
(58) Field of Classification Search ........ 359/368–390, 359/642, 656–664, 717–719; 369/44, 112; 264/1.1, 2.5
     See application file for complete search history.

(56) References Cited

U.S. PATENT DOCUMENTS

| | | | |
|---|---|---|---|
| 4,155,962 A | 5/1979 | Neefe | 264/1 |
| 4,540,534 A | 9/1985 | Grendol | 264/2.2 |
| 4,798,428 A | 1/1989 | Karim et al. | 385/74 |
| 5,121,256 A | 6/1992 | Corle et al. | 359/664 |
| 5,171,995 A | 12/1992 | Gast et al. | 250/339 |
| 5,317,452 A | 5/1994 | Prentiss et al. | 359/815 |
| 5,583,351 A | 12/1996 | Brown et al. | 257/189 |
| 5,729,393 A | 3/1998 | Lee et al. | 359/819 |
| 5,764,613 A | 6/1998 | Yamamoto et al. | 369/112 |
| 5,776,191 A | 7/1998 | Mazzocco | 623/6 |

(Continued)

FOREIGN PATENT DOCUMENTS

EP       0362993 A2      4/1990

(Continued)

OTHER PUBLICATIONS

Ashkin, A. et al., "Optical Trapping And Manipulation Of Single Cells Using Infrared Laser Beams," Nature, vol. 330, No. 24, pp. 769-771, Dec. 31, 1987.

(Continued)

*Primary Examiner*—Thong Q Nguyen
(74) *Attorney, Agent, or Firm*—Townsend and Townsend and Crew LLP

(57) ABSTRACT

A microlens structure such as a solid immersion lens structure is a radiation transmissive pliant elastomer cast to a desired shape and smoothness. A method for construction of a solid immersion lens structure includes providing a mold defining a lens shaped cavity in which a solid immersion lens is cast, casting a translucent liquid elastomeric material into the lens cavity, permitting the elastomeric material to set to form the solid immersion lens portion and removing the solid immersion lens portion from the mold. A specific material for use as the solid immersion lens is a translucent silicone elastomer of a refractive index greater than n=1.4, such as General Electric RTV 615.

2 Claims, 3 Drawing Sheets

U.S. PATENT DOCUMENTS

| | | | |
|---|---|---|---|
| 5,792,610 A * | 8/1998 | Witney et al. | 435/6 |
| 5,815,306 A | 9/1998 | Sheridon et al. | 359/296 |
| 5,939,709 A | 8/1999 | Ghislain et al. | 250/216 |
| 6,181,478 B1 | 1/2001 | Mandella | 359/642 |
| 6,200,737 B1 | 3/2001 | Walt et al. | 430/230 |
| 6,236,513 B1 | 5/2001 | Mallary et al. | 359/642 |
| 6,270,696 B1 | 8/2001 | Jain et al. | 264/1.1 |
| 6,277,545 B1 | 8/2001 | Iida et al. | 430/320 |
| 6,298,026 B1 | 10/2001 | Suzuki et al. | 369/112 |
| 6,301,055 B1 | 10/2001 | Legrand et al. | 359/642 |
| 6,307,689 B1 | 10/2001 | Ichimura et al. | 359/823 |
| 6,369,957 B1 | 4/2002 | Ishida et al. | 359/719 |
| 6,498,776 B1 * | 12/2002 | Nakano et al. | 369/112.23 |
| 6,503,831 B1 | 1/2003 | Speakman | 438/674 |
| 6,548,171 B1 | 4/2003 | Barbera-Guillem et al. | 428/402.24 |
| 6,560,030 B1 | 5/2003 | Legrand et al. | 359/642 |
| 6,608,726 B1 | 8/2003 | Legrand et al. | 359/392 |
| 6,614,598 B1 | 9/2003 | Quake et al. | 359/664 |
| 6,687,196 B1 * | 2/2004 | Ueyanagi | 369/13.33 |
| 6,781,690 B1 | 8/2004 | Armstrong et al. | 356/301 |
| 6,809,886 B1 * | 10/2004 | Hsu et al. | 359/719 |
| 6,836,384 B1 | 12/2004 | Quake et al. | 359/642 |
| 2003/0032204 A1 | 2/2003 | Walt et al. | 436/518 |
| 2003/0076649 A1 | 4/2003 | Speakman | 361/524 |
| 2005/0052754 A1 | 3/2005 | Quake et al. | 359/664 |

FOREIGN PATENT DOCUMENTS

| | | | |
|---|---|---|---|
| JP | 8-001810 A | 1/1996 | |
| JP | 11-197587 A | 7/1999 | |
| JP | 2000-89004 A | 3/2000 | |
| JP | 2001-43557 * | 2/2001 | 359/642 |
| WO | WO98/19854 A1 | 5/1998 | |

OTHER PUBLICATIONS

Ashkin, A. et al., "Optical Trapping And Manipulation Of Viruses And Bacteria," Science, vol. 235, pp. 1517-1520, Mar. 20, 1987.

Buican, Tudor N. et al., "Automated Single-Cell Manipulation And Sorting By Light Trapping," Applied Optics, vol. 26, No. 24, pp. 5311-5316, Dec. 15, 1987.

Hornbeck, Larry J. et al., "Bistable Deformable Mirror Device," Spatial Light Modulators and Applications 1988 Technical Digest Series, Summaries of papers presented at the Spatial Light Modulators and Applications Topical Meeting, Optical Society of America, vol. 8, Postconference Edition, A215, pp. 107-110, Jun. 15-17, 1988.

Lin, L. Y. et al., "Free-Space Micromachined Optical Switches For Optical Networking," IEEE Journal of Selected Topics in Quantum Electronics, vol. 5, No. 1, pp. 4-9, Jan. 1999.

Muller, Richard S. et al., "Surface-Micromachined Microoptical Elements And Systems," Proceedings of the IEEE, vol. 86, No. 8, pp. 1705-1720, Aug. 1998.

Yang, T. J. et al., "An Apertureless Near-Field Microscope For Fluorescence Imaging," Applied Physics Letters, vol. 76, No. 3, pp. 378-380, Jan. 17, 2000.

Berg, Howard C. "Dynamic properties of bacterial flagellar motors", Nature, vol. 248, May 3, 1974, pp. 77-79.

Berry, Richard M. et al, "Absence of a barrier to backwards rotation of the bacterial flagellar motor demonstrated with optical tweezers", Proc. Natl. Acad. Sci, USA. vol. 94, pp. 14433-14437, (Dec. 1997).

Brody et al. "A Self-Assembled Microlensing Rotational Probe" Applied Physics Letters, 1999, pp. 144-146, vol. 74, No. 1.

Elson, Elliot L. "Fluoresence Correlation Spectroscopy and Photobleaching Recovery", Ann. Rev. Phys. Chem. (1985):36:379-406.

Finer, Jeffrey T. et al. "Single mysoin molecule mechanics: piconewton forces and nanometre steps." Nature, vol. 368, Mar. 10, 1994, pp. 113-119.

Jameson, D.M. and Hazlett, T.L. "Time-Resolved Fluorescence in Biology and Biochemistry", Biophysical and Biochemical Aspects of Fluorescence Spectroscopy; T.G. Dewey Ed., (1991), pp. 105-133, Plenum Publishing Corp.

Kinosita, Kazuhiko Jr. et al. "F.sub.1—ATPase: A rotary motor made of a single molecule", Cell, vol. 93, pp. 21-24, Apr. 3, 1998.

Mervis, J. et al. "Aligning and attaching a lens to an optical fiber using light pressure force", Optics Letters, vol. 18, No. 5, Mar. 1, 1993, p. 325-327.

Miguez, H. et al. "Photonic crystal properties of packed submicrometric $SiO_2$ spheres", American Institute of Physics (1997), pp. 1148-1150.

Perkins, Thomas T. "Relaxation of a single DNA molecule observed by optical microscopy" Science, vol. 264, May 6, 1994, pp. 822-825.

Shingyoji, Chikako et al. "Dynein arms are oscillating force generators", Nature, vol. 393, Jun. 18, 1998, pp. 711-714.

Silverman, Michal et al, "Flagellar rotation and the mechanism of bacterial motility", Nature vol. 249, May 3, (1974), pp. 73-74.

Smith, Stephen P. et al. "Inexpensive optical tweezers for undergraduate laboratories", Am. J. Phys. 67(1), Jan. 1999, pp. 26-35.

Svoboda, Karel et al. "Direct observation of kinesin stepping by optical trapping interferometry", Nature, vol. 365, Oct. 21, 1993, pp. 721-727.

Lessard, Guillanume A., et al., "A scanning apertureless fluorescence microscope," Department of Applied Physics, California Institute of Technology, Pasadena, CA, 8 pages, 1999.

* cited by examiner

SOLID IMMERSION LENS STRUCTURES AND METHODS FOR PRODUCING SOLID IMMERSION LENS STRUCTURES

CROSS-REFERENCES TO RELATED APPLICATIONS

This application is a continuation of and claims the benefit of application Ser. No. 10/465,526 filed Jun. 18, 2003, now U.S. Pat. No. 6,836,384, which is a continuation of application Ser. No. 09/928,226, filed 08/10/2001, now U.S. Pat. No. 6,608,726. which is a continuation-in-part of application Ser. No. 09/640,907 filed Aug. 16, 2000, now U.S. Pat. No. 6,301,055 all of which are incorporated herein by reference for all purposes.

STATEMENT AS TO RIGHTS TO INVENTIONS MADE UNDER FEDERALLY SPONSORED RESEARCH OR DEVELOPMENT

The U.S. Government has certain rights in this invention pursuant to Grant No. HG 01642 awarded by the National Institute of Health and under Contract No. PHY-9722417 of the National Science Foundation.

This application is related to application Ser. No. 09/927,290, now U.S. Pat. No. 6,560,030, which is a division of application Ser. No. 09/640,907. The contents of all related applications are incorporated herein by reference for all purposes.

This application contains claims based on unexamined claims in the first-filed application in this series.

Reference to a "Sequence Listing," a Table, or a Computer Program Listing Appendix Submitted on a Compact Disk

NOT APPLICABLE

BACKGROUND OF THE INVENTION

The present invention relates to microlens structures as for example solid immersion lens (SIL) structures and in particular to techniques for constructing SIL structures, as well as selected applications of such structures.

Due to the limitations on resolutions obtainable with conventional optical lenses for applications such as microscopy, techniques have been developed to decrease the Rayleigh limit on transverse resolution $\delta$. The Rayleigh limit is given by $\delta = 0.82 \lambda/(NA)$ where $\lambda$ is the wavelength and NA is the numerical aperture of the focusing objective ($NA = n \sin(\theta)$), where n is the refractive index of the medium, and $\theta$ is the angle between the outermost rays focusing on the sample and the optical axis)

Coherent light such as laser light can be used to precisely control the wavelength of illumination $\lambda$. One way to decrease the transverse resolution is to increase the index of refraction of the optical medium, such as by use of oil-immersion microscopy or use of a solid immersion lens.

If an SIL is placed in contact with the sample under examination, illumination can be more readily focused on it, and use of the high NA of the system allows efficient collection of the excitation light with high optical transmission efficiency and observation of the sample with a very high resolution. In most of the cases, the SIL is used primarily for near-field microscopy, where the air gap between the SIL and the sample oblige those who do not want to use evanescent waves to work with a NA smaller than one.

A problem with the SIL technology is the complexity of its manufacture. For example, a polished glass sphere provided with a sequence of progressively finer alumina powders requires a polishing time typically of many hours. Furthermore, the result is not perfect, and the polished surface is slightly rounded. Moreover, known lens structures in SIL configurations involve objective lens sets that are self contained and thus are difficult to use in a manner that maintains the lens in immersion contact with the object under observation.

What is needed is a method for construction of inexpensive, substantially identical microlenses such as solid immersion lenses and lens elements in arrays and a lens structure which is simple and rapid to construct and which is suited for low-cost, even disposable usage.

SUMMARY OF THE INVENTION

According to the invention, a microlens structure, such as a solid immersion lens structure is formed of a radiation transmissive low temperature moldable material such as an elastomer cast to a desired shape and smoothness in a pliant mold which has highly undercut margins. Further according to the invention, a method for construction of a solid immersion lens structure includes providing a pliant mold defining a lens-shaped cavity in which a solid immersion lens is cast, casting a liquid material into the lens cavity, permitting the liquid material to set to form the solid immersion lens portion and removing the solid immersion lens portion from the pliant mold with the highly undercut margins. A specific material for use as the solid immersion lens is a thermally-resilient deformable material such as optically-clear silicone elastomer of a refractive index n greater than 1.2 and preferably greater than 1.4, such as a room temperature vulcanization (RTV) elastomer, specifically General Electric RTV 615. Preferably, the mold itself may be constructed of this material and the SIL structure can be a rigid setting material. The SIL structures according to the invention may be a disposable lens element and/or a light collection element integrated with a device such as a microfabricated flow cytometer.

According to a specific embodiment of a method according to the invention, a first liquid elastomer such as RTV is injected into a container and allowed to solidify to a pliant elastomeric solid, then a small nonreactive bead of the shape of the desired lens (a sphere) is placed on the first layer then partially covered with a layer of the liquid elastomer of a controlled thickness less than the diameter of the bead and allowed to solidify to stable pliancy. Thereafter the shaping bead is removed to yield a pliant smooth-walled mold of maximum diameter d with highly undercut margins around an orifice. The mold and adjacent region are then treated with an oxygen plasma to create a nonreactive, nonbinding surface interface. Then a third layer of optically-clear liquid moldable material, such as an RTV elastomer, having a thickness slightly greater than the depth of the mold is injected into the mold and over the region around the orifice and then allowed to solidify. The resultant structure is peeled from the pliant second layer to yield a lens element in the form of a bead, a convex shape, a concave shape, a flat face, a rib or Fresnel element embedded on an attached flange, namely a solid immersion lens structure in accordance with the invention. The pliant second layer is reusable as a mold.

Further according to the invention, a method is provided for imaging an object using a low cost lens element in an SIL configuration. According to this method, an object to be observed, preferably immersed in fluid, is guided along a passage defined by an integrally molded-together body portion and a solid immersion lens portion, where the solid immersion lens portion is optically aligned with a position in the passage. The object is positioned in the passage in alignment with the solid immersion lens portion so that the object is within a field of view extending through the solid immersion lens portion. The object in the passage is photoexcited to induce a photophysical reaction. The object, immersed in a fluid of high index of refraction, is viewed through the solid immersion lens portion of an even higher index of refraction, and the object is imaged onto a viewing surface.

Further according to the invention, a method is provided for collecting light emissions with high efficiency through a low cost lens element in an SIL configuration. An object to be observed is immersed in fluid and positioned in alignment with the solid immersion lens portion so that the object is within a field of light collection extending through very large numerical aperture spherical solid immersion lens portion. The object, immersed in a fluid of high index of refraction, emits observable optical energy typically by fluorescence in response to excitation, and the emissions at selected wavelengths are collected through the spherical solid immersion lens portion of an even higher index of refraction and directed to a sensor so that the emissions can be measured. The structure admits to high collection efficiency. Furthermore the structure allows improved ability to concentrate illuminating light.

Further according to the invention, a solid immersion lens structure comprises a solid immersion lens portion with highly undercut margins interfacing on a flange portion, together with a body portion in which there is a cavity or passage for carrying an object or sample to be imaged or from which light is to be collected, where at least the solid immersion lens portion is of a molded material formed in a mold of pliant material with highly undercut margins.

In some embodiments, the microlens structure defines an inlet leading into the passage and an outlet leading from the passage. The object of observation is guided along a passage comprising passing the object through the inlet and along the passage. The object is supported in a liquid, and the liquid is pumped along the passage, thereby passing the object through the inlet and along the passage.

The invention will be better understood by reference to the following detailed description and the accompanying diagrammatic drawings.

DESCRIPTION OF SPECIFIC EMBODIMENTS

Figure 1:
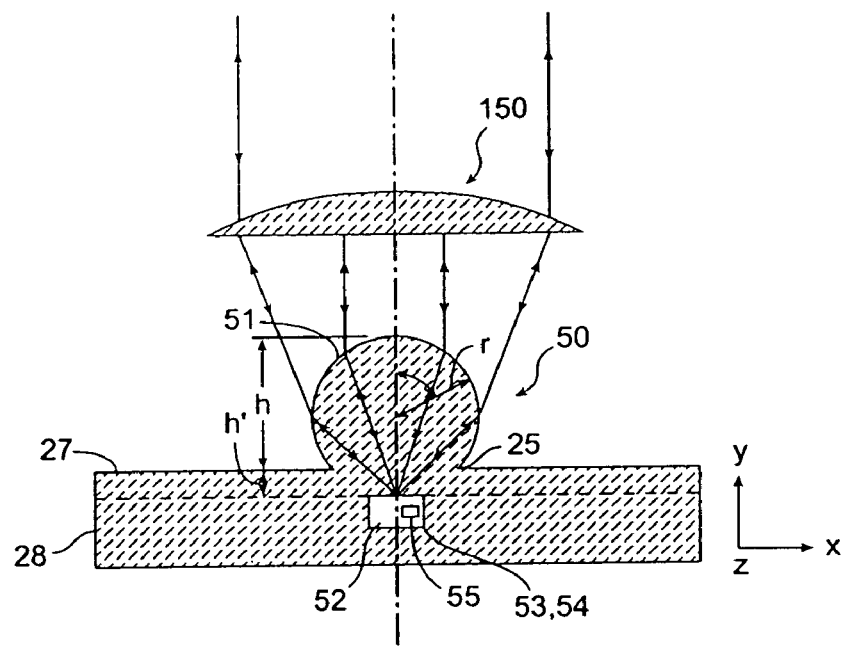
FIG. 1 shows a schematic cross-sectional view of a solid immersion lens structure according to the invention.

In order to understand the invention, it is helpful to define the terms associated with a microlens structure, such as a solid immersion lens SIL structure 50 as it might be used in a device such as a microscope, spectroscope or cytometer. FIG. 1 illustrates the functioning of a solid immersion lens, with indication of the parameters used to describe the structure and operation. A solid immersion lens portion 51 comprises a sphere of radius r and index of refraction $n_s$. It is disposed at a highest height h above a surface 27 of a body portion 28 so that a boundary margin 25 is formed which is narrower in diameter than the diameter of the lens portion 51. An observation region 52 is provided at a distance h' from the surface 27. Samples are placed in the region for observation according to the intended application, such as microscopy, spectroscopy, cytometry, and fluorescence based screening. Also shown with the structure 50 is a collection/collimating lens 150. The spherical structure and collection configuration admits to construction of lens systems having a numerical aperture higher than unity, which is particularly useful for ultrasensitive spectroscopy.

Figure 2:
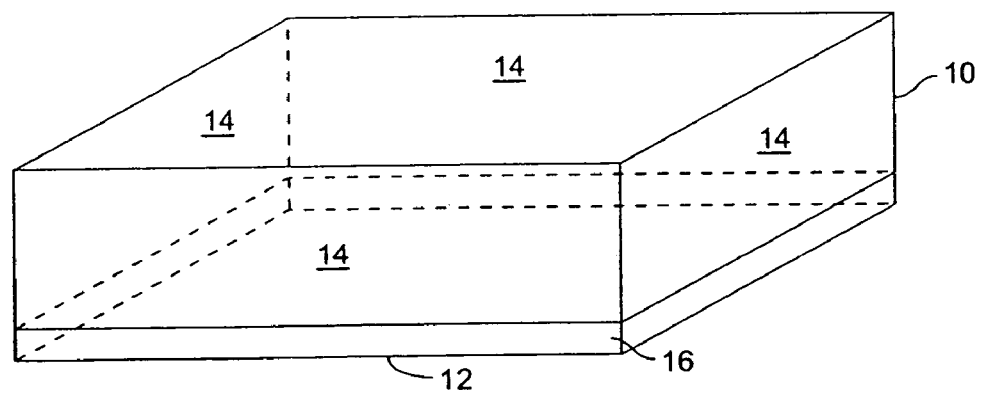
FIG. 2 shows a schematic three-dimensional view of an initial step in a method for producing a solid immersion lens structure in accordance with the invention.
Figure 3:
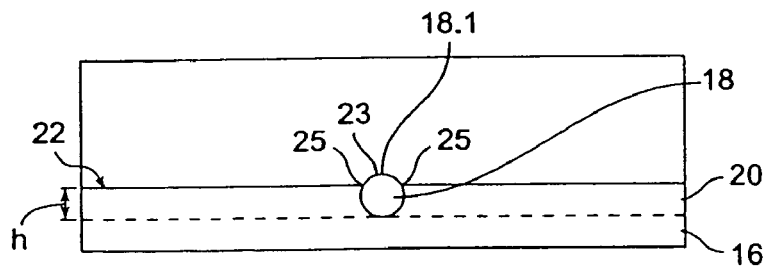
FIG. 3 shows a cross-sectional view corresponding to FIG. 2 indicating further steps of producing a solid immersion lens structure in accordance with the invention.

A method for producing a solid immersion lens structure in accordance with the invention is described with reference to FIGS. 2–4. Referring to FIG. 2, a container 10, typically in the form of a shallow dish defining a base wall 12 and four peripheral upstanding sidewalls 14 provides the housing for a mold. To produce the solid immersion lens structure in accordance with the method of the invention, a mold is formed. To form the mold, a first layer 16 of moldable material from which the mold is to be formed is cast into the container 10. The first layer 16 is then permitted to set. Referring now to FIG. 3, once the first layer 16 has set, a mold core 18 is positioned in the container 10 on the first layer 16. In this instance the mold core is a spherical bead of uniformly smooth surface, such as a steel bead of radius r=~0.8 mm–4.5 mm. A second layer 20 of moldable material is then cast into the container of height h=~1 mm–5 mm partially to encapsulate the mold core 18, thereby to form a second layer of moldable material 20 immediately adjacent the first layer 16. The second layer 20 defines an upper surface 22 at height h such that an upper portion 18.1 of the generally spherical mold core 18 protrudes through an orifice 23 of diameter d from the upper surface 22 and creates highly undercut margins 25 around the orifice 23. In order for the mold to be reusable where the structure has such undercut margins, the second layer, according to the invention, must be of a pliant material such as a silicone elastomer, such as a room temperature vulcanization (RTV) elastomer, specifically General Electric RTV 615.

The constraint on the height h is given by the following relation:

$$r(1-\cos \Phi) < h < r + r/n_s$$

where r is the radius of the sphere, h is the height of the layer, $\Phi$ is the polar angle from the center of the sphere to the edge of the orifice formed by the undercut margins, $n_s$ is the index of refraction of the material which forms the lens.

Thus the geometric details of the mold depend upon the thickness of the second layer 20 relative to the radius of the bead. The radius of the bead may be useful in the following dimensions: 150, 200, 250, 300, 400, and 500 microns. The RTV is an elastomer made by mixing polymers, cross linkers and a catalyst. While it cures at room temperature, it is typically set for two hours at a slightly elevated temperature of 80° C. The preferred RTV comprises a first part of a polydimethylsiloxane bearing vinyl groups and a platinum catalyst and a second part of a cross linker containing silicon hydride (Si—H) groups. Once mixed, the silicon hydride groups form a covalent bond with the vinyl groups.

Figure 4:
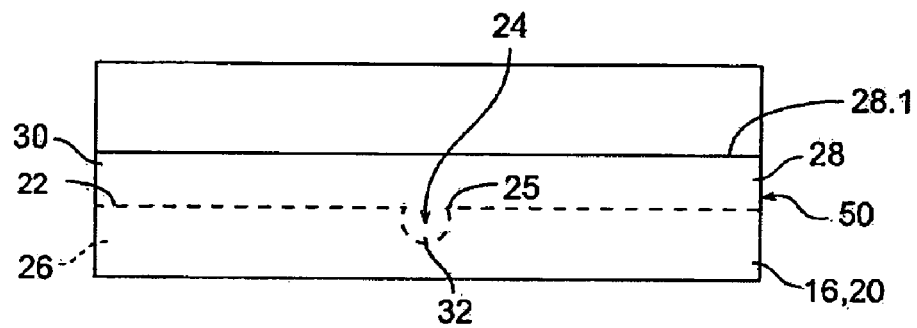
FIG. 4 shows a cross-sectional view corresponding to FIG. 3 showing a subsequent step in a method of producing a solid immersion lens structure in accordance with the invention.

Referring to FIG. 4, once the layer 20 has set, the mold core 18 is removed so as to define a lens cavity 24. In this manner, a mold 26 for producing a solid immersion lens structure, in accordance with the invention, is produced. To minimize the chance of bonding between the mold and the lens, the surface is treated with an oxygen plasma to form an anti-adhesive layer 27. For example, oxidized RTV blocks bonding so the molded lens can be removed from the lens cavity 24.

Still referring to FIG. 4 and to FIG. 1, the solid immersion lens structure 50 is produced by casting a moldable material into the lens cavity 24. The moldable material from which the solid immersion lens portion of the solid immersion lens structure is to be formed may be cast into the container 10 to fill not only the lens cavity 24, but also to form a layer 28 in the container 10, the layer 28 defining an upper surface 28.1 above (as shown) the lens cavity 24. The thickness h' above the surface 27 is given by the relation:

$$h' = r + r/n_s - h.$$

The layer 28 forms a body portion of the solid immersion lens structure 50 when the moldable material of layer 28 has set. In this manner, the body portion of the solid immersion lens structure is integrally molded together with the solid immersion lens portion 51.

When the layer 28 has set, the solid immersion lens structure in accordance with the invention, which includes a body portion 30 and a solid immersion lens portion 32 is formed. The solid immersion lens structure is then removed from the mold.

The material from which the SIL structure 50 is made in mold 26 may be of any suitable radiation transparent material that can be cast as a liquid at a temperature less than the temperature at which the mold 26 is damaged or otherwise undesirably deformed. The SIL structure may cure to a generally rigid solid or a pliant solid. Among the materials considered to be generally suitable are low temperature of formation polymers, room temperature vulcanization elastomers, low temperature of formation epoxies, polyimides, polycarbonates and photoresists. The lens material 50 can be a pliant silicone elastomer. A suitable silicone elastomer is General Electric RTV 615, or Sylgard the same material used to create the mold 26 itself.

As is clear from FIG. 4, the lens cavity 24 has a transverse dimension greater than the transverse dimension of orifice 23 of the cavity 24. The moldable material from which the mold 26 is made is deformable so that when the moldable material from which the solid immersion lens structure 50 in accordance with the invention is made, has set, and is removed from the mold 26, a region of the mold 26 adjacent the mouth is permitted to temporarily deform thereby to permit the solid immersion lens portion to pass therethrough.

Referring now to FIG. 1, a solid immersion lens structure, generally indicated by reference numeral 50, is indicated. The structure 50 has been formed in accordance with the method of the invention as described above with reference to FIGS. 2–4 of the drawings. In addition, the structure 50 has been formed to define a sample observation region 52 in a passage extending therethrough. This passage may be formed in any suitable manner, such as by positioning an elongate mold core in the layer 28, with reference to FIG. 4, prior to the moldable material defining layer 28 having set. The elongate mold core from which the passage 52 is formed can be of a material which disintegrates when exposed to a suitable agent. Accordingly, when the structure 50 has been formed, the core can be removed by exposing it to the suitable agent thereby to remove the core from the structure 50 and to yield the hollow region 52. Alternatively, the region 52 can be formed in any one of the ways described in Applicants' co-pending patent application Ser. No. 09/605,520 filed Jun. 27, 2000. For example the region 52 can be formed as part of a two-step construction process whereby the height h' is precisely defined during the first step and then the passage and a body portion is added as a second step.

The microlens structure defines an inlet 53 leading into the passage 52 and an outlet 54 leading from the passage 52. The liquid supports an object 55 in the passage 52. The liquid is pumped through the inlet 53 and along the passage causing the object 55 to pass through the inlet and along the passage 52 in the direction of the z axis.

Figure 5:
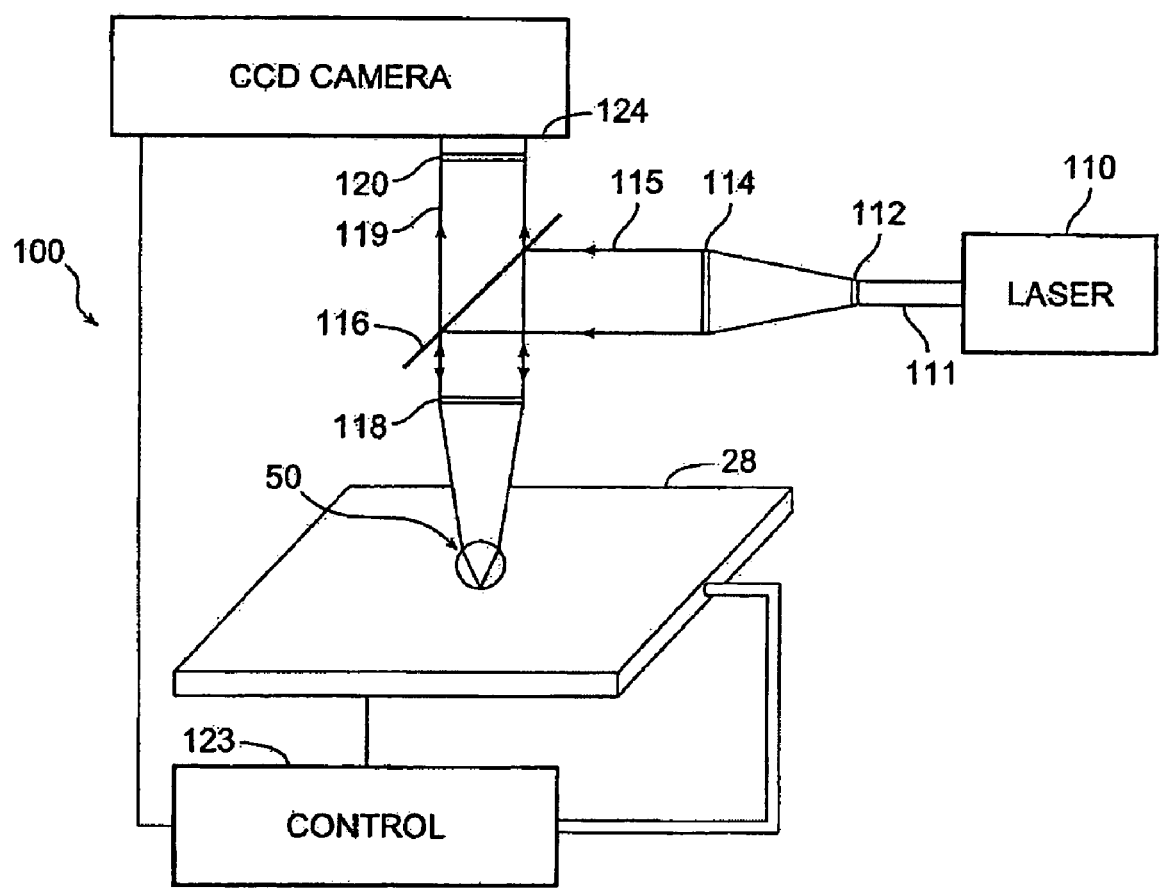
FIG. 5 shows an imaging system comprising a solid immersion lens structure in accordance with the invention.

FIG. 5 is illustrative of an imaging system 100 employing an SIL 50 in accordance with the invention. An example is a microscope. The system includes an illuminating device such as a laser 10 projecting a beam 111, an expansion lens 112, a first collimating lens 114, a partially transmissive mirror 116, a second collimating lens 118, an SIL structure 50, a focusing lens 120, an image detector such as a CCD camera 124 and a control apparatus 123. In operation, the laser 110 projects an illumination beam 111 through expansion lens 112 and collimating lens 114 to produce a broad coherent monochromatic illumination beam 115. The beam 115 is reflected by mirror 116 to second collimating lens 118 through which it is focused through an air medium to the SIL structure 50. Focus adjustment is by means of positioning of the second collimating lens 118 relative to the SIL structure 50. The SIL structure 50 further focuses to a spot in the sample chamber (not shown) within the body portion, in immersion contact with the lens. The sample is positioned by the control apparatus 123. (The control apparatus 123 may both position a platform and supply the object or sample to be viewed.) Light reflected from the object is directed back through the second collimating/focusing lens 118 which focuses to infinity and directs the image 119 through the half silvered mirror 116 to a third focusing/collimating lens 120. The third focusing/collimating lens 120 focuses the image as magnified onto an image sensor 124, such as a CCD array of a CCD camera. The relative positioning of the lens 120 and the image sensor 124 determines focus of the image. Other microscope configurations may be employed as suggested by this configuration. Significantly, the SIL structure 50, although an essential element of the optical system is obtained from a manufacturing process which yields extremely inexpensive optical elements as compared to conventional lenses, so the SIL structure 50, which is integral with the sample carrier, is disposable. This is believed to be a significant advance over conventional SIL technology. This also presents significant practical advantages over methods using oil immersion objectives. It is not necessary to use oil between the lens and sample since they are integrally molded. In addition, an oil immersion objective must be positioned with high accuracy with respect to the sample. However, a solid immersion lens can be fabricated as the appropriate distance away from the sample so that focal precision would be needed to adjust the distance between an oil immersion lens and the sample.

Figure 6:
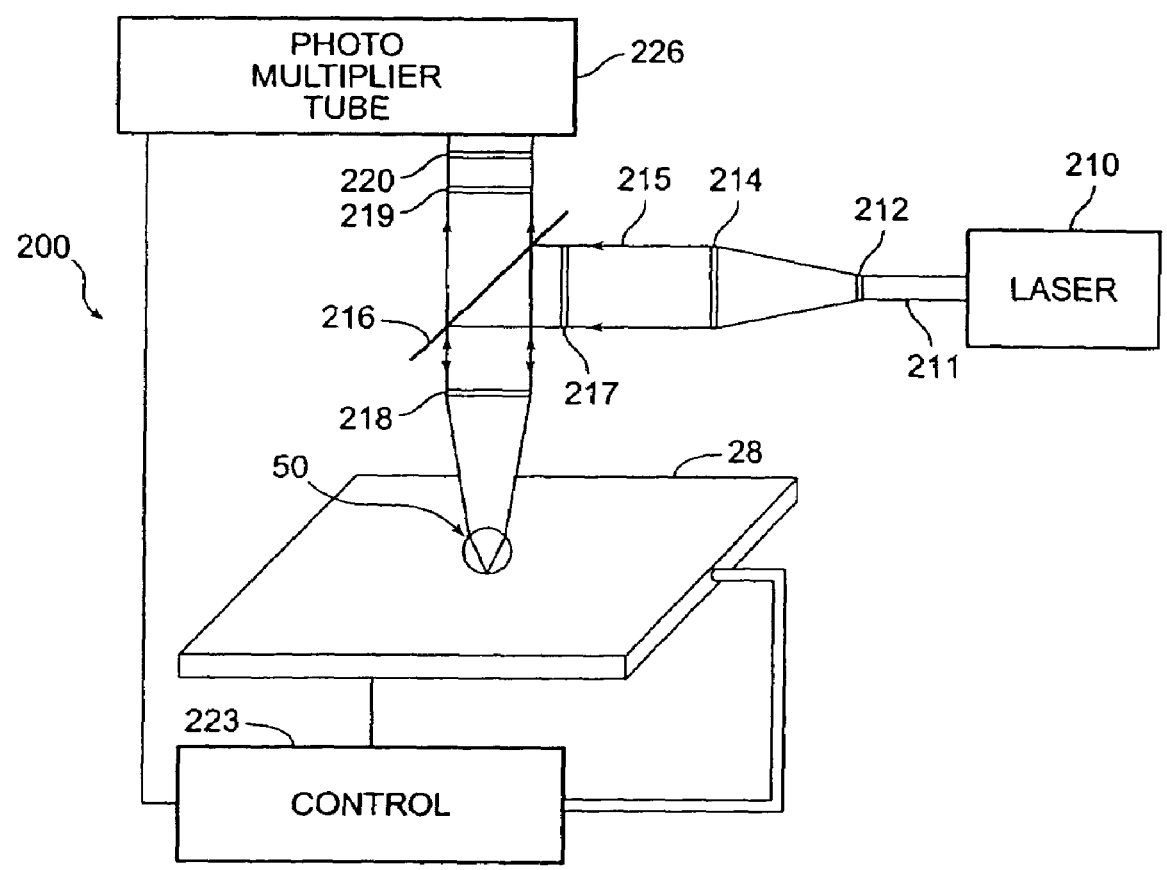
FIG. 6 shows an emission collection system comprising a solid immersion lens structure in accordance with the invention.

FIG. 6 is illustrative of a light collection system 200 employing an SIL 50 in accordance with the invention. An example is a cytometer or a highly efficient spectrometer. The system 200 includes a laser 210 projecting a beam 211, an expansion lens 212, a first collimating lens 214, an optional first dichroic filter 217 selected for passing the selected output wavelength of the laser 210, a partially transmissive mirror 216, a second collimating lens 218, an 511 structure 50, a second dichroic filter 219 selected for passing the selected emission of the sample, a collection lens 220, a photon collection device such as a photomultiplier tube 226 and a control apparatus 223. In operation, the laser 210 projects an illumination beam 211 through expansion lens 212 and collimating lens 214 to produce a broad coherent monochromatic illumination beam 215. Its purity is further selected by filter 217 so that the illumination can be used as an excitation probe. The beam 215 is reflected by mirror 216 to second collimating lens 218 through which it is focused through an air medium to the SIL structure 50. Focus adjustment is by means of positioning of the second collimating lens 218 relative to the SIL structure 50. However, as an emission collection apparatus, imaging is not the goal. The SIL structure 50 further concentrates the illumination in the sample chamber (not shown) within the body portion, in immersion contact with the lens. The sample is excited by the illumination and positioned by the control apparatus 223. (The control apparatus 223 may both position a platform and supply the object or sample to be viewed.) The illumination excites the sample to cause it to emit fluorescent energy which is collected by the high numerical aperture lens and is directed back through the second collimating lens 218 which focuses to infinity and directs the emitted photonic energy through the half silvered mirror 216 to the second filter 219, which blocks any stray excitation, and then through the third collimating lens 220. The third collimating lens 220 concentrates the photonic energy into a collection region of a photon sensor such as a photomultiplier tube (PMT) 226. The relative positioning of the lens 220 and the PMT 226 determine the collection efficiency. This application is believed to be a new application of an SIL structure. Other configurations may be employed as suggested by this configuration. For example, an array of solid immersion lenses may be positioned over an array of samples such as might be found on a gene chip, microtiter plate or microslide. Significantly, the SIL structure 50, although an essential element of the optical system is obtained from a manufacturing process which yields extremely inexpensive optical elements as compared to conventional lenses, so the SIL structure 50, which is integral with the sample carrier, is disposable. This is believed to be a significant advance over conventional SW technology.

A number of applications of this microlens manufacturing technology are enabled by this invention, particularly array structures. For example, the invention may be used to fabricate microprisms and gratings wherein the mold produces ribs or corrugations. The microlens manufacturing technology can be used to provide lens arrays for displays such as LCD arrays to tailor the light dispersion characteristics of each pixel element. Such lens arrays could be spherical, concave, convex, flat, of differing height, disposed at an angle to yield grating and Fresnel structures.

While this invention has been described in connection with applications where extremely small lenses are needed, it should be understood that lenses manufactured according to the inventive methods may be used in any application that seeks to maximize light collection efficiency, particularly where the range of lens diameter is between about 10 microns and less than one mm.

The invention has been explained with reference to specific embodiments. Other embodiments will be evident to those of ordinary skill in the relevant art. For example, variations in materials (and therefore variations in indices of refraction) of the optical components may be used, as well as certain variations in their optical parameters such as focal length and numerical aperture, and form of the lens. Moreover, the invention may be used in a number of types of optical recording and playback. It is therefore not intended that this invention be limited, except as indicated by the appended claims.

What is claimed is:

1. A method for imaging an object, the method comprising:
    guiding the object along a passage defined by an integrally molded-together solid immersion lens structure, the solid immersion lens structure defining a body portion, in which the passage is defined, and a solid immersion lens portion having a numerical aperture greater than unity, the solid immersion lens portion being optically aligned with a position in the passage;
    positioning the object in the passage at the position which is optically aligned with the solid immersion lens portion so that the object is within a field of view extending through the solid immersion lens portion;
    photoexciting the object in the passage to induce a photophysical reaction; and
    viewing the object in the passage through the solid immersion lens portion while the object is at the position in the passage which is optically aligned with the solid immersion lens portion.

2. A method as claimed in claims 1, wherein photo exciting the object through the solid immersion lens while at the position in the passage which is optically aligned with the solid immersion lens portion comprises optically aligning a microscope with the solid immersion lens portion, and viewing the object through the microscope.

* * * * *